US008644428B2

(12) United States Patent
Kim et al.

(10) Patent No.: US 8,644,428 B2
(45) Date of Patent: Feb. 4, 2014

(54) SYSTEM AND METHOD FOR CHANNEL INTERPOLATION

(75) Inventors: Taejoon Kim, Berkeley, CA (US); Timothy M. Schmidl, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 304 days.

(21) Appl. No.: 13/284,667

(22) Filed: Oct. 28, 2011

(65) Prior Publication Data

US 2012/0106614 A1 May 3, 2012

Related U.S. Application Data

(60) Provisional application No. 61/407,952, filed on Oct. 29, 2010.

(51) Int. Cl.
*H03D 1/00* (2006.01)
*H04L 27/06* (2006.01)

(52) U.S. Cl.
USPC .......................................... 375/340; 375/350

(58) Field of Classification Search
USPC .......... 375/224, 316, 340, 350; 370/206, 491, 370/500
See application file for complete search history.

(56) References Cited

U.S. PATENT DOCUMENTS

| 7,468,940 | B2* | 12/2008 | Higashino | 369/59.22 |
|---|---|---|---|---|
| 8,325,433 | B2* | 12/2012 | Zhang et al. | 360/39 |
| 2005/0265466 | A1* | 12/2005 | Wang | 375/260 |
| 2008/0075205 | A1* | 3/2008 | Lee et al. | 375/343 |
| 2008/0144752 | A1* | 6/2008 | Zhou et al. | 375/347 |
| 2010/0177251 | A1* | 7/2010 | Kimura et al. | 348/726 |
| 2013/0223553 | A1* | 8/2013 | Zhu et al. | 375/267 |

OTHER PUBLICATIONS

Institute of Electrical and Electronics Engineers, Inc., IEEE Draft Standard, Part 15.4: Low Rate Wireless Personal Area Networks (WPANs), Amendment 4: Physical Layer Specifications for Low Data Rate Wireless Smart Metering Utility Networks, P802.154g/D5, May, 2011, New York, New York, 212 pages.

* cited by examiner

*Primary Examiner* — Jean B Corrielus
(74) *Attorney, Agent, or Firm* — John R. Pessetto; Wade J. Brady, III; Frederick J. Telecky, Jr.

(57) ABSTRACT

A system and method for channel interpolation in a wireless device. In one embodiment a wireless device includes a channel estimator. The channel estimator is configured to generate estimated channel coefficients for a wireless channel over which the wireless device receives a packet. The channel estimator includes an interpolation filter. The interpolation filter is configured to provide interpolated channel coefficients for a plurality of non-pilot sub-carriers. The interpolated channel coefficients are based on pilot sub-carriers of non-preamble symbols.

9 Claims, 3 Drawing Sheets

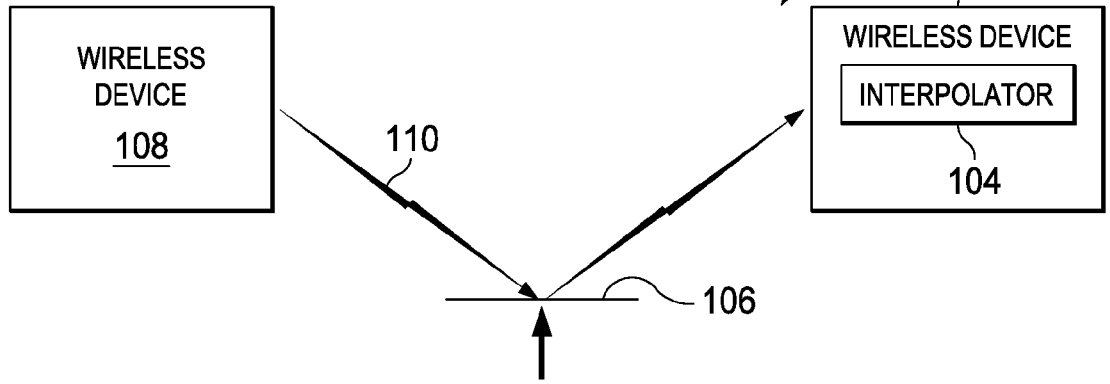
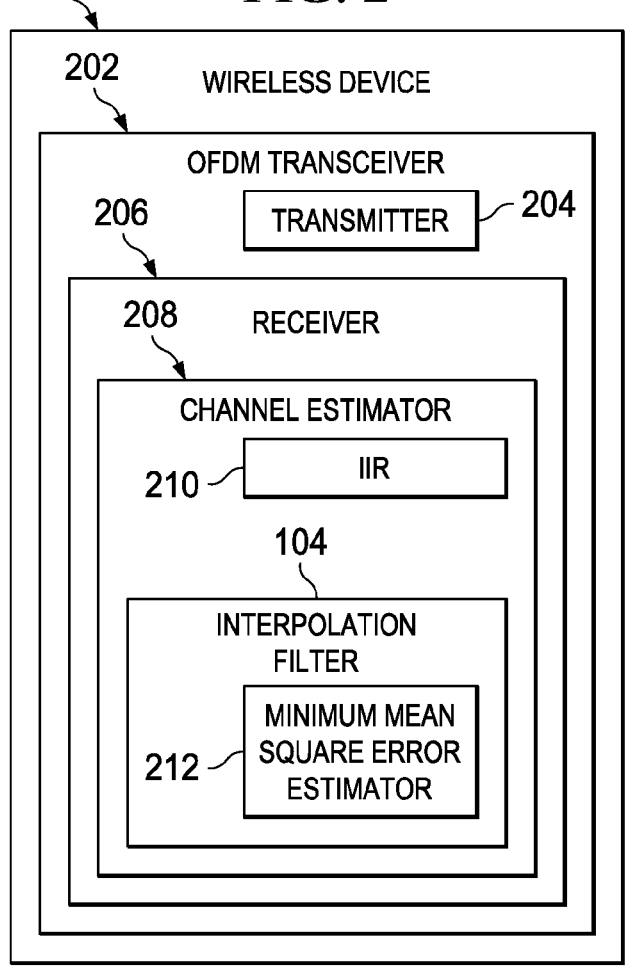

SYSTEM AND METHOD FOR CHANNEL INTERPOLATION

CROSS-REFERENCE TO RELATED APPLICATION

The present application claims priority to U.S. Provisional Patent Application No. 61/407,952, filed on Oct. 29, 2010; which is hereby incorporated herein by reference in its entirety.

BACKGROUND

Wireless personal area networks (WPANs) are used to convey information over relatively short distances. A WPAN may transfer data at a relatively low rate to minimize power consumption. Unlike wireless local area networks (WLANs), WPANs employ little or no infrastructure. Consequently, WPANS allow small, power-efficient, and inexpensive solutions to be implemented for a wide range of devices.

Smart Utility Networks (SUNs) are one application of WPAN technology. A SUN may operate either over short ranges such as in a mesh network where utility meter information is sent from one utility meter to another, or over longer ranges such as in a star topology where utility meter information is sent to a pole-top collection point. The terms WPAN and SUN are used interchangeably herein.

In wireless communications systems, transmissions between devices encounter a variety of stationary and moving reflective surfaces (buildings, vehicles, etc.). In WPANs using orthogonal frequency division multiplexing (OFDM), relative motion of a transmitter, receiver, or reflective surface can cause Doppler shift in the carrier frequencies that produces inter-carrier interference.

SUMMARY

A system and method for channel interpolation in a wireless device. In one embodiment a wireless device includes a channel estimator. The channel estimator is configured to generate estimated channel coefficients for a wireless channel over which the wireless device receives a packet. The channel estimator includes an interpolation filter. The interpolation filter is configured to provide interpolated channel coefficients for a plurality of non-pilot sub-carriers. The interpolated channel coefficients are based on pilot sub-carriers of non-preamble symbols.

In another embodiment, a method includes receiving, by a wireless device, a wirelessly transferred orthogonal frequency division multiplexed packet. Interpolated channel coefficients for non-pilot subcarriers of the packet are generated by interpolating the pilot sub-carriers of non-preamble symbols of the packet. Channel coefficients for a wireless channel over which the packet was communicated are generated based on the interpolated channel coefficients.

In yet another embodiment, a computer readable storage medium is encoded with instructions. When executed, the instructions cause a processor to generate interpolated channel coefficients for non-pilot subcarriers of a received orthogonal frequency division multiplexed packet. The interpolated channel coefficients are generated by interpolating pilot sub-carriers of non-preamble symbols of the packet. The computer-readable storage medium also includes instructions that cause the processor to estimate channel coefficients for a wireless channel over which the packet was communicated based on the interpolated channel coefficients.

BRIEF DESCRIPTION OF THE DRAWINGS

For a detailed description of exemplary embodiments of the invention, reference will now be made to the accompanying drawings in which:

FIG. 1 shows a block diagram of a communication network including a wireless device with a channel interpolator in accordance with various embodiments;

FIG. 2 shows a block diagram of a wireless device including a channel interpolator in accordance with various embodiments;

NOTATION AND NOMENCLATURE

Figure 3:
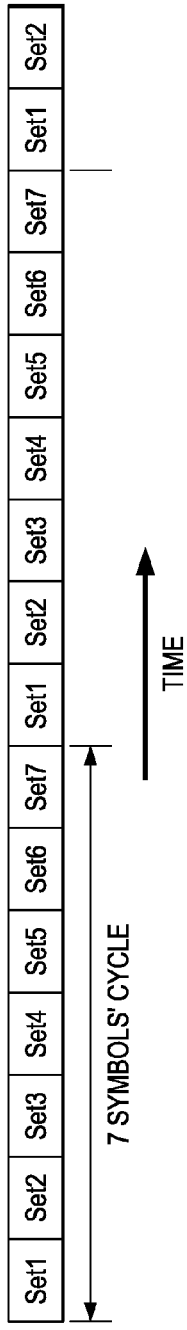
FIG. 3 shows repetition of sets of pilots in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regard less of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of additional factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

A utility network or smart utility network (SUN) is a low-rate (e.g., 40 kbps to 1 Mbps) low-power wireless personal area network (WPAN) that is specifically designed for use in utility metering applications such as transmitting electric, gas, water usage, and other like data from the customer premises to a data collection point operated by the utility. For example, utility meters are installed for each house in a residential neighborhood, and the usage data is sent periodically from each utility meter to a data collection point, which is an element of the SUN. The data collection point is connected by fiber, copper wire, or wireless connection to a central office that collects all the usage data for a region. Usage data is sent either directly from each utility meter to the collection point or from utility meter to utility meter until the collection point is reached in a star or network formation, respectively.

Orthogonal frequency division multiplexing (OFDM) spreads a data stream across a large number of orthogonal sub-carriers. The sub-carriers allow for reduced modulation rates and can enhance signal reliability in multipath environments. OFDM is used in a variety of wireless communication systems, including SUNs. In a SUN, the low transmission rate can result in relatively long packet transmission times. Doppler shift occurring during packet transmission can result in undesirable intra-packet channel changes.

In an OFDM system, pilot tones may be provided to enable a receiver to track changes of the channel due to Doppler shift, and to track residual carrier frequency (and/or sampling rate) offset. The position of the pilot tones within an OFDM symbol may be fixed across all OFDM symbols, or change in a predetermined pattern from symbol to symbol. For example, in the IEEE 802.11n wireless local area network standard, the pilot tone positions are fixed for all OFDM symbols. In contrast, the IEEE 802.15.4 g Smart Utility Network standard shifts the pilot tones to different positions with each successive OFDM symbol.

Embodiments of the present disclosure efficiently estimate channels for OFDM systems from pilots in the frequency domain. Embodiments include a channel interpolation filter that collects the pilot tones scattered across an OFDM symbol, and interpolates channel estimates for all sub-carriers based on the collected pilot tones. Thus, embodiments adapt to variance in Doppler shift during a packet that affects the channel.

FIG. 1 shows a block diagram for a wireless communication system 100 incorporating a channel interpolation filter 104 in accordance with various embodiments. The system 100 includes wireless device 102 and 108. The wireless devices 102 and 108 are configured to transmit and/or receive OFDM signals. Though only two wireless devices 102, 108 are shown, in practice the system 100 may include any number of wireless devices. In some embodiments, the wireless devices 102, 108 may be SUN devices in accordance with the IEEE 802.15.4 standard.

The wireless device 108 transmits a signal for reception by the wireless device 102. The signal can arrive by a line-of-sight path and/or by one or more reflecting paths which are termed multipath. The signal taking the path 110 is reflected by the moving reflector 106 as the signal travels between the wireless devices 108, 102 causing a Doppler shift in the sub-carriers received by the wireless device 102. The moving reflector 106 may be a vehicle or any reflective surface moving relative to the wireless device 102.

The wireless device 102 includes a channel interpolation filter 104 that estimates the channel for all sub-carriers of an OFDM symbol based on the pilot tones scattered across the symbol. The interpolation allows the wireless device 102 to characterize the channel for each sub-carrier, thereby improving sub-carrier detection.

FIG. 2 shows a block diagram of the wireless device 102. The wireless device 102 includes an OFDM transceiver 202 for wirelessly transmitting and/or receiving OFDM signals. The OFDM transceiver 202 includes an OFDM transmitter 204 and an OFDM receiver 206. The OFDM transmitter 204 includes components for transmitting an OFDM signal, such as amplifiers, D/A converters, filters, a cyclic prefix generator, an inverse Fourier transformer, pilot tone generators, preamble generators, encoders, modulators, etc.

The OFDM receiver 206 may be a coherent receiver, and includes components for receiving a wireless transmitted OFDM signal, such as amplifiers, filters, digitizers, a Fourier transformer, demodulators, decoders, symbol detectors, etc. The receiver 206 also includes a channel estimator 208. The channel estimator 208 estimates the channel conditions for all sub-carriers of an OFDM symbol. The channel estimator 208 includes the interpolation filter 104, and an infinite impulse response (IIR) filter 210. The interpolation filter 104 gathers the pilot tones that are scattered across the OFDM symbol, and interpolates over the pilot tones to generate interpolated channel coefficients for the data subcarriers. The interpolation filter 104 includes a minimum mean square error (MMSE) estimator 212 to perform the interpolation. The IIR filter 210 generates channel coefficient updates based on previously estimated channel values and newly generated channel interpolations.

The operation of the channel estimator 208 and channel interpolation filter 104 are now described with reference to a particular embodiment of the system 100 and wireless device 102 where the size of the OFDM system Fourier transform is 64 at 1× oversampling and only 52 sub-carriers out the 64 tones are active. The tone locations for the 52 active tones are defined as [−26:−1] and [1:26]. The DC tone is unused. Four of the 52 tones are used as pilots. Seven sets of four pilot tones are defined, and the pilot tones change positions in each subsequent OFDM symbol in accordance with a different one of the seven sets. Thus, the seven sets of four pilot tones are repeated every seven symbols as shown in FIG. 3.

The pilot tone locations among the 52 active tones, for each of the seven sets, may be defined as:

Set1: [−26, −14, −2, 10],
Set2: [−22, −10, 2, 14],
Set3: [−18, −6, 6, 18],
Set4: [−26, −14, 22, 26],
Set5: [−22, −10, −2, 10],
Set6: [−18, −6, 2, 14], and
Set7: [6, 18, 22, 26].

Figure 4:
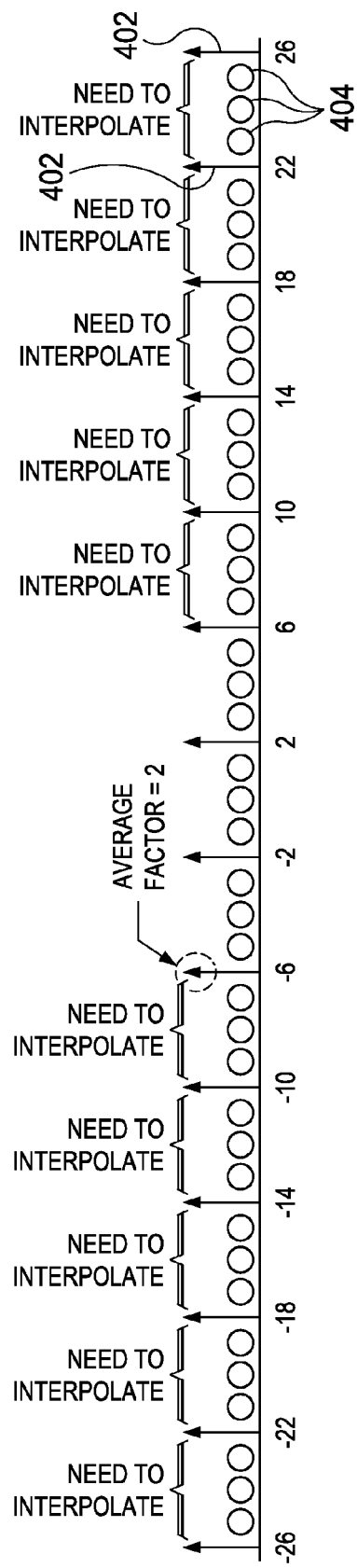
FIG. 4 shows an exemplary frequency domain display of symbols averaged over time in accordance with various embodiments.

The channel interpolation filter 104 collects the pilots scattered over seven symbols. In some embodiments, the scattered pilots are collected by taking the block time average for a block length (over the seven sets). FIG. 4 shows an exemplary frequency domain display of seven symbols averaged over time by the interpolation filter 104. The average includes the fourteen collected pilots 402 and the data sub-carriers 404 positioned between the pilots 402.

To estimate the channel, the channel interpolation filter 104 interpolates channel estimates for the 52 sub-carriers using the 14 pilot tones shown in FIG. 4. The frequency domain signal at the pilot locations can be expressed as:

$$Y_{14\times 1}=H_{14\times 1}+N_{14\times 1} \quad (1)$$

where:
$Y_{14\times 1}$ denotes the received signal at the pilot locations,
$H_{14\times 1}$ describes the channel coefficients at the pilot locations, and $N_{14\times 1}$ is the noise vector at the pilot locations whose entries are distributed as normal Gaussian with $N(0, \sigma^2/2)$.

The MMSE estimator 212 provides a linear combination of random observations to estimate the value of the random process at any other instances. Estimation of the channel corresponding to the 52 tones given the 14 collected pilots observations with MMSE criterion can be formulated as:

$$z_i = \underset{\tilde{z}_i}{\operatorname{argmin}} E|H_i - \tilde{z}_i^* Y_{14\times 1}|^2 \quad (2)$$

The solution of the optimization problem of equation (2) is given by:

$$Z_i^T = R_{H_{14\times 1}H_i}^T R_{Y_{14\times 1}Y_{14\times 1}} \quad (3)$$

where:

$$R_{Y_{14\times 1}Y_{14\times 1}} = (R_{H_{14\times 1}H_{14\times 1}} + \sigma^2 I)^{-1} P_{14\times 14}, \quad (4)$$

$$R_{H_{14\times 1}H_{14\times 1}} = E[H_{14\times 1}H_{14\times 1}^*], \text{ and} \quad (5)$$

$$R_{H_{14\times 1}H_i} = E[H_{14\times 1}H_i^*]. \quad (6)$$

To construct the optimal MMSE filter weight of Equation 1, knowledge of the channel covariance matrix may be required. However, obtaining knowledge of channel covariance statistics may be challenging. Therefore, embodiments of the present disclosure include a filter that is not dependent on exact channel distribution. Thus, embodiments allow non-real-time determination the filter weights, rather than computing new filter coefficients for every packet.

Assuming the worst case delay spread profile (which is the uniform power delay profile) results in a channel covariance matrix expressed by the sinc function. With this simplification, the sinc function-based MMSE channel interpolator weight is given by:

$$z_i^T = \operatorname{sinc}\left(\frac{L[P_{index} - i]}{n_{FFT}}\right)(R_{H_{14\times 1}H_{14\times 1}} + \sigma_{reg}^2 I)^{-1} \quad (7)$$

where $P_{index}$ denotes a row vector that describes the index of the pilot. For the exemplary sub-carrier arrangement described herein, the index vector is given by $P_{index}=[1:4:49]$. The channel covariance matrix $R_{H_{14\times 1}H_{14\times 1}}$ is given by equation (8) below:

$$R_{H_{14\times 1}H_{14\times 1}} = E\left[\begin{bmatrix} H_{-26} \\ H_{-22} \\ \vdots \\ H_{22} \\ H_{26} \end{bmatrix} \cdot [H_{-26}^* \; H_{-22}^* \; \ldots \; H_{22}^* \; H_{26}^*]\right]$$

$$= \begin{bmatrix} \operatorname{sinc}\left(0\frac{L}{n_{FFT}}\right) & \operatorname{sinc}\left(4\frac{L}{n_{FFT}}\right) & \operatorname{sinc}\left(8\frac{L}{n_{FFT}}\right) & \ldots & \operatorname{sinc}\left(52\frac{L}{n_{FFT}}\right) \\ \operatorname{sinc}\left(-4\frac{L}{n_{FFT}}\right) & \operatorname{sinc}\left(0\frac{L}{n_{FFT}}\right) & \operatorname{sinc}\left(4\frac{L}{n_{FFT}}\right) & \ldots & \operatorname{sinc}\left(48\frac{L}{n_{FFT}}\right) \\ \vdots & \vdots & \vdots & & \vdots \\ \operatorname{sinc}\left(-52\frac{L}{n_{FFT}}\right) & \operatorname{sinc}\left(-48\frac{L}{n_{FFT}}\right) & \operatorname{sinc}\left(-44\frac{L}{n_{FFT}}\right) & \ldots & \operatorname{sinc}\left(0\frac{L}{n_{FFT}}\right) \end{bmatrix}$$

where, the channel rank L and the regularization factor $\sigma_{reg}^2$ are design parameters.

The filter weight in equation (7) is real, which is possible if the receiver Fourier transform placement is adjusted to center the channel. Embodiments cyclically shift the input to the Fourier transform by L/2 to provide such centering.

The MMSE estimator is an inherently biased estimator. So, overestimating (using a larger value than the true noise variance) the regularization factor may provide improved performance.

The channel rank L is a function of channel delay spread and operating signal-to-noise ratio (SNR). The regularization factor $\sigma_{reg}^2$ is a function of operating SNR. Consequently, embodiments of the MMSE estimator 212 can include a predefined mapping table that maps the operating SNR (or estimated SNR) and channel propagation condition to L and $\sigma_{reg}^2$. Thus, embodiments of the MMSE estimator 212 include a filter weight table, and select an appropriate filter weight from the table using the operating (or estimated) SNR and channel propagation condition. The filter weights stored in the table may be determined in non-real-time.

Figure 5:
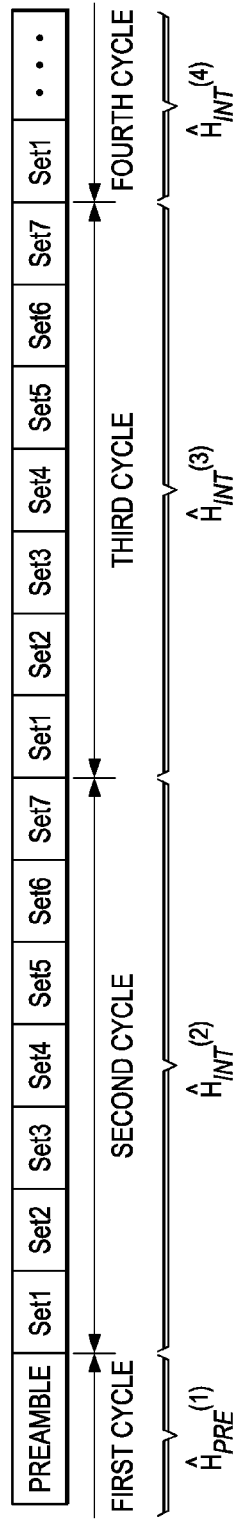
FIG. 5 shows a diagram of an exemplary orthogonal frequency division multiplexed packet in accordance with various embodiments.

The packets transferred by the wireless OFDM system 100 include a preamble from which an initial channel estimate for the packet may be formulated. FIG. 5 shows a diagram of an exemplary OFDM packet including a preamble and the symbols arranged to include the seven sets of pilots described above. The preamble may include training fields (e.g., long and/or short training fields) from which embodiments of the channel interpolation filter 104 derive an initial channel estimate. Channel estimates derived from the preamble may be expressed as $$\hat{H}\text{Pre},i^{(1)} \text{ for } i=1:N \quad (9)$$

and, channel estimates obtained by interpolation of the pilots may be defined as:

$$\hat{H}_{INT,i}^{(k)} \text{ for } i=1:N \text{ and } k=2,3, \tag{10}$$

where the index k denotes the channel estimate update index.

Some embodiments of the channel estimator 208 include the IIR filter 210 to update the channel values. The IIR filter 210 may be a first order IIR, and the amount of memory required by the IIR 210 is defined by a forgetting factor ρ (with 0≤ρ≤1). The IIR filter 210 may defined as:

$$\hat{H}^{(k+1)} = \rho \hat{H}^{(k)} + (1-\rho)\hat{H}_{INT}^{(k+1)}, \tag{11}$$

where k=1, 2, ..., and with $\hat{H}^{(1)} = \hat{H}_{Pre}^{(1)}$. In an alternative embodiment, the IIR filter 210 is replaced by a finite impulse response (FIR) filter. A simple FIR filter may average the previous N values of the estimates of $\hat{H}_{INT}^{(k)}$ to obtain the current channel estimate.

Thus, the channel estimator 208 applies channel estimates obtained at the kth cycle to the next k+1th cycle to equalize the channels.

The forgetting factor ρ can be defined in various ways. In some embodiments of the channel estimator 208, uses the Jakes' model with $\rho = J_0(2\pi f_D T)$ to determine the forgetting factor ρ where:

$J_0(\cdot)$ represents the zeroth order Bessel function;

T denotes the symbol duration;

$$f_D = \frac{v f_c}{c}$$

denotes the maximum Doppler frequency where v is the velocity;

$f_c$ is the carrier frequency; and $c = 3 \times 10^8$ meters per second.

Some embodiments of the channel estimator 208 determine ρ using the ratio of the number of samples used in frequency interpolation to the number of samples used in combined and updated channel estimation. For example, the channel estimator 208 may derive a channel estimate from the preamble using two symbols of the preamble, the two symbols corresponding to 52*2=104 samples. Accordingly, the number of samples used in the combined channel estimation is 104+28=132. The number of samples used in frequency interpolation is 28. The ratio 28/132=0.21 reflects the value 1−ρ.

Various components of the wireless device 102 including at least some portions of the channel estimator 208 and the interpolation filter 104 can be implemented using a processor in the wireless device 102 executing software programming that causes the processor to perform the operations described herein. In some embodiments, the interpolation filter 104 includes a processor executing software programming that causes the processor to collect the pilots scattered across an OFDM symbol and interpolate the channel based on the collected pilots. The collection and interpolation may apply one or more of the techniques disclosed herein.

Suitable processors include, for example, general-purpose microprocessors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

Software programming that causes a processor to perform the operations disclosed herein can be stored in a computer readable storage medium. A computer readable storage medium comprises volatile storage such as random access memory, non-volatile storage (e.g., a hard drive, an optical storage device (e.g., CD or DVD), FLASH storage, read-only-memory), or combinations thereof. Those skilled in the art understand that processors execute software instructions, and that software instructions alone are incapable of performing a function. Therefore, any reference to a function performed by software, or to software performing a function is simply a shorthand means for stating that the function is performed by a processor executing the software, or a processor executing the software performs the function.

Some embodiments can implement portions of the wireless device 102, including portions of the channel estimator 208 and the interpolation filter 104 using dedicated circuitry (e.g., dedicated circuitry implemented in an integrated circuit). Some embodiments may use a combination of dedicated circuitry and a processor executing suitable software. For example, some portions of the interpolation filter 104 may be implemented using a processor or hardware circuitry. Selection of a hardware or processor/software implementation of embodiments is a design choice based on a variety of factors, such as cost, time to implement, and the ability to incorporate changed or additional functionality in the future.

Figure 6:
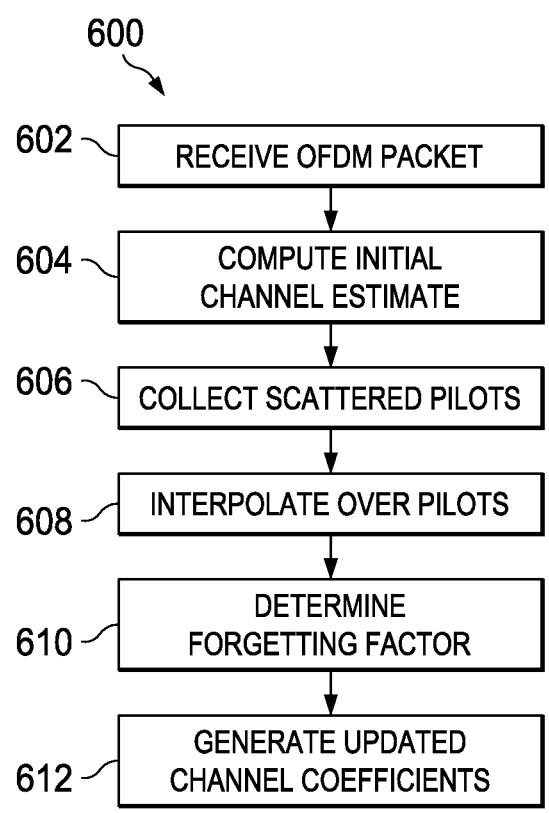
FIG. 6 shows a flow diagram for a method for channel interpolation in a wireless receiver in accordance with various embodiments.

FIG. 6 shows a flow diagram for a method 600 for channel interpolation in a wireless device 102 in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 600, as well as other operations described herein, can be performed by a processor executing instructions stored in a computer readable medium.

In block 602, the wireless device 102 receives an OFDM packet. The packet includes a preamble and a plurality of OFDM symbols. Each symbol includes a plurality of pilot tones. The positions of the pilot tones within the symbol change from symbol to symbol. In an alternative embodiment the pilot tone positions can change every few symbols, such as every 2 symbols.

In block 604, the received packet is provided to the channel estimator 208. The channel estimator 208 computes an initial channel estimate based on the symbols included in the preamble. For example, the channel estimator 208 may compute an initial channel estimate based on the symbols of a short training field and/or a long training field of the preamble.

In block 606, the interpolation filter 104 collects the pilot tones scattered over a number of OFDM symbols of the packet. For example, the interpolation filter may collect the pilots scattered over seven symbols as illustrated in FIG. 4. The interpolation filter 104 may gather the pilot tones by averaging the plurality of OFDM symbols containing the pilot tones.

In block 608, the interpolation filter 104 applies the MMSE estimator 212 to the gathered pilot tones. The MMSE estimator 212 interpolates over the pilot tones to generate channel coefficient values corresponding to the sub-carriers positioned between the pilot tones.

In block 610, the channel estimator 208 determines a forgetting factor for use in the IIR filter 210. In some embodiments, the forgetting factor is based on a ratio of the number of samples used in the interpolation to the number of samples used in the combining and updating. In some embodiments, the forgetting factor is determined using the Jakes model.

In block 612, the channel estimator 208 applies the IIR filter 210 to generate an updated set of channel coefficients from the channel values produced by a previous update and the last determined interpolated channel values. The receiver 206 applies the updated channel values to perform coherent signal detection.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A wireless device, comprising:
a channel estimator configured to generate estimated channel coefficients for a wireless channel over which the wireless device receives a packet, the channel estimator comprising:
an interpolation filter configured to provide interpolated channel coefficients for a plurality of non-pilot sub-carriers, the interpolated channel coefficients based on pilot sub-carriers of non-preamble symbols;
wherein the interpolation filter is configured to collect pilot sub-carriers scattered across a plurality of symbols of the packet;
wherein the positions of the pilot sub-carriers within a symbol change from symbol to symbol, and the interpolation filter is configured to average the collected pilot sub-carriers and provide interpolated channel coefficients for a plurality of sub-carriers between adjacent collected pilot sub-carriers.

2. A wireless device, comprising:
a channel estimator configured to generate estimated channel coefficients for a wireless channel over which the wireless device receives a packet, the channel estimator comprising:
an interpolation filter configured to provide interpolated channel coefficients for a plurality of non-pilot sub-carriers, the interpolated channel coefficients based on pilot sub-carriers of non-preamble symbols;
wherein the channel estimator includes an infinite impulse response (IIR) filter configured to update the estimated channel coefficients based on a last determined set of estimated channel coefficients and a last determined set of interpolated channel coefficients.

3. The wireless device of claim 2, wherein the IIR filter combines the last determined set of estimated channel coefficients and the last determined set of interpolated channel coefficients based on forgetting factor, and the forgetting factor comprises a ratio of the number of samples used in the interpolation filter to the number of samples used to update the estimated channel coefficients.

4. A method, comprising:
receiving, by a wireless device, a wirelessly transferred orthogonal frequency division multiplexed packet;
generating, by the wireless device, interpolated channel coefficients for non-pilot subcarriers of the packet by interpolating the pilot sub-carriers of non-preamble symbols of the packet;
estimating channel coefficients for a wireless channel over which the packet is communicated based on the interpolated channel coefficients;
wherein the generating further comprises collecting pilot sub-carriers scattered across a plurality of symbols of the packet;
wherein the generating further comprises averaging the collected pilot sub-carriers and providing the interpolated channel coefficients for a plurality of sub-carriers between adjacent collected pilot sub-carriers;
wherein positions of the pilot sub-carriers within a symbol change from symbol to symbol.

5. A method, comprising:
receiving, by a wireless device, a wirelessly transferred orthogonal frequency division multiplexed packet;
generating, by the wireless device, interpolated channel coefficients for non-pilot subcarriers of the packet by interpolating the pilot sub-carriers of non-preamble symbols of the packet;
estimating channel coefficients for a wireless channel over which the packet is communicated based on the interpolated channel coefficients;
wherein the estimating further comprises updating the estimated channel coefficients by combining a last determined set of estimated channel coefficients and a last determined set of interpolated channel coefficients.

6. The method of claim 5, wherein the combining further comprises scaling the last determined set of estimated channel coefficients and the last determined set of interpolated channel coefficients based on a forgetting factor; wherein the forgetting factor comprises a ratio of the number of samples used in the interpolating to the number of samples used in the combining.

7. A non-transitory computer readable medium encoded with instructions that when executed cause a processor to:
generate interpolated channel coefficients for non-pilot subcarriers of a received orthogonal frequency division multiplexed packet by interpolating the pilot sub-carriers of non-preamble symbols of the packet; and
estimate channel coefficients for a wireless channel over which the packet is communicated based on the interpolated channel coefficients;
encoded with instructions that when executed cause the processor to:
collect pilot sub-carriers scattered across a plurality of symbols of the packet;
average the collected pilot sub-carriers and provide the interpolated channel coefficients for a plurality of sub-carriers between adjacent collected pilot sub-carriers;
wherein positions of the pilot sub-carriers within a symbol change from symbol to symbol.

8. A non-transitory computer readable medium encoded with instructions that when executed cause a processor to:
generate interpolated channel coefficients for non-pilot subcarriers of a received orthogonal frequency division multiplexed packet by interpolating the pilot sub-carriers of non-preamble symbols of the packet; and
estimate channel coefficients for a wireless channel over which the packet is communicated based on the interpolated channel coefficients
encoded with instructions that when executed cause the processor to update the estimated channel coefficients by combining a last determined set of estimated channel coefficients and a last determined set of interpolated channel coefficients.

9. The non-transitory computer readable medium of claim 8, wherein the combining comprises scaling the last determined set of estimated channel coefficients and the last determined set of interpolated channel coefficients based on a forgetting factor, and the forgetting factor comprises a ratio of the number of samples used in the interpolating to the number of samples used in the combining.

* * * * *